Dec. 31, 1935.  F. L. BAKENER  2,025,844
APRON FOR CULTIVATOR SHOVELS
Filed April 30, 1935
Fig. 1.
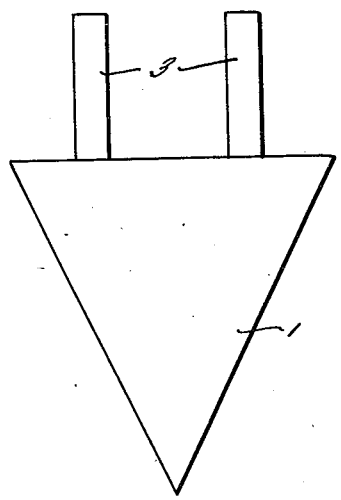
Fig. 2.
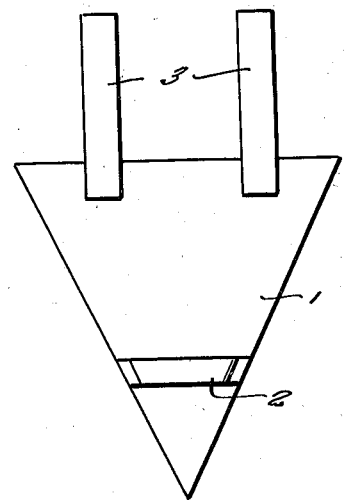
Fig. 3.
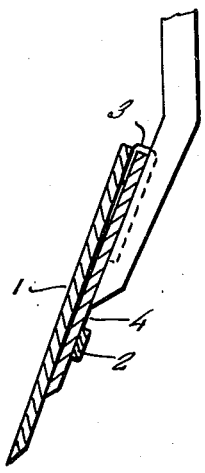
Fig. 4.
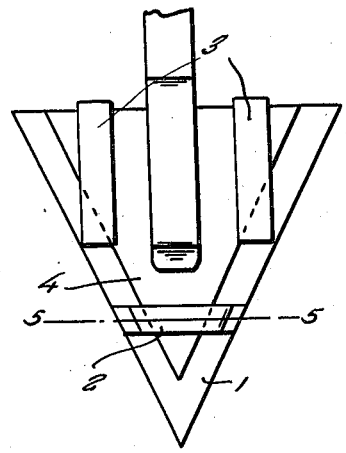
Fig. 5.
Inventor
F. L. Bakener
By Clarence A. O'Brien
Attorney Patented Dec. 31, 1935

2,025,844

UNITED STATES PATENT OFFICE 2,025,844

APRON FOR CULTIVATOR SHOVELS

Floyd L. Bakener, Byron, Ill.

Application April 30, 1935, Serial No. 19,119

1 Claim. (Cl. 97—203)

This invention relates to an apron for a cultivator shovel, the general object of the invention being to provide an apron substantially the same size of a new shovel, with means for attaching the apron to the front of the shovel when the shovel has become worn.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a front view of the apron.

Figure 2 is a rear view thereof.

Figure 3 is a vertical sectional view showing the apron applied to a worn shovel.

Figure 4 is a rear view of Figure 3.

Figure 5 is a section on the line 5—5 of Figure 4.

In these views the apron is shown at 1 and it is of substantially the same shape and size of a cultivator shovel before the same is worn and said apron has a strap 2 extending across the lower part and forming a loop as shown in Figure 5. A pair of bendable straps 3 is connected to the top of the apron at the rear side thereof. Thus when the worn shovel is to be built up to its original size the apron is placed on the front face thereof with the loop receiving the lower end of the shovel, the shovel being shown at 4, and the straps 3 are bent over the upper edge of the shovel so that the loop and these two straps will hold the apron in place. By providing the bendable straps 3 the apron can be used on shovels which have worn to different degrees.

This invention will eliminate the buying of new shovels to take the place of worn ones and as it can be readily put into place very little time and labor is required to attach the apron to the worn shovel.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

An apron for a worn cultivator shovel consisting of a body of substantially the same shape as the shovel before it became worn and means for detachably connecting the apron to the front face of the shovel, said means including a strap connected to the rear face of the apron at the lower portion thereof and forming a loop for receiving the lower end of the shovel and bendable straps connected with the upper edge of the apron and adapted to be bent over the upper edge of the shovel.

FLOYD L. BAKENER.